United States Patent [19]

Müller et al.

[11] 4,057,224

[45] Nov. 8, 1977

[54] PROCESS AND APPARATUS FOR DIRECTLY CONTACTING TWO COUNTERFLOWING IMMISCIBLE LIQUID PHASES

[75] Inventors: Eckart Müller, Bergen-Enkheim; Thomas Simo, Frankfurt am Main; Helmut Markwort; Berthold Scholz, both of Oberursel, all of Germany

[73] Assignee: Metallgesellschaft Aktiengesellschaft, Frankfurt am Main, Germany

[21] Appl. No.: 749,335

[22] Filed: Dec. 10, 1976

[30] Foreign Application Priority Data

Dec. 19, 1975  Germany .............................. 2557327

[51] Int. Cl.² ............................................ B01F 15/02
[52] U.S. Cl. .................. 366/336; 23/270.5 T
[58] Field of Search ............... 259/4 R, 4 AB, 4 AC, 259/4 A, 18, 36; 138/38, 42; 23/270.5 R, 270.5 T; 208/317, 314

[56] References Cited

U.S. PATENT DOCUMENTS

| | | | |
|---|---|---|---|
| 2,609,276 | 9/1952 | Casler | 208/317 |
| 2,610,108 | 9/1952 | Packie | 208/317 |
| 2,615,792 | 10/1952 | Bacsik | 208/317 |
| 2,721,788 | 10/1955 | Schad | 259/4 AB |
| 2,794,711 | 6/1957 | Hall | 259/4 AB |
| 3,417,967 | 12/1968 | Richens | 259/4 AC |
| 3,835,886 | 9/1974 | Zajac | 259/4 AB |

Primary Examiner—Robert W. Jenkins
Attorney, Agent, or Firm—Karl F. Ross

[57] ABSTRACT

A process for contacting two counterflowing immiscible liquid phases in a column in which perforated plates define mixing zones and separating zones and in which each mixing zone receives a heavy-liquid phase entering through perforations from above and a light-liquid phase entering through perforations from below and a dispersion formed by the two liquid phases in each mixing zone is transferred from the latter into a juxtaposed separating zone from which the heavy-liquid phase is withdrawn downwardly through perforations and the light-liquid phase is withdrawn upwardly through perforations. The dispersion is contacted in the separating zones with a filling of a material which accelerates coalescence.

22 Claims, 9 Drawing Figures

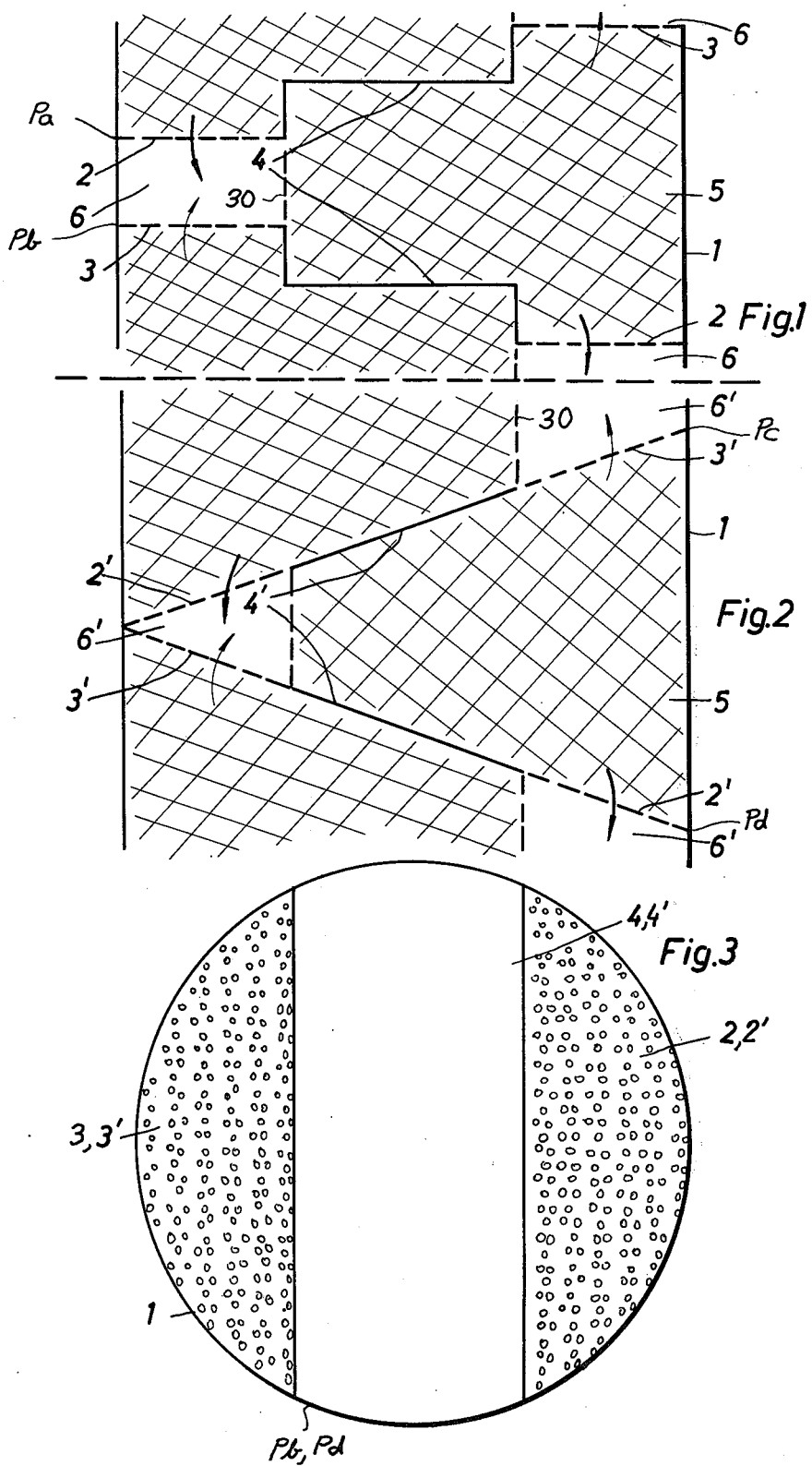

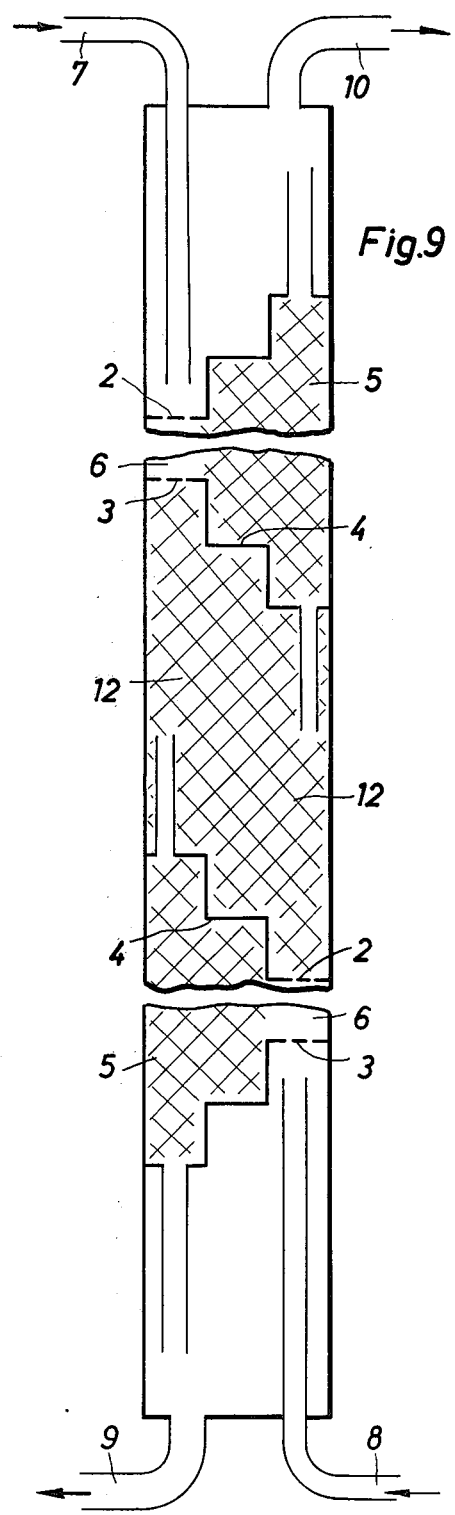

PROCESS AND APPARATUS FOR DIRECTLY CONTACTING TWO COUNTERFLOWING IMMISCIBLE LIQUID PHASES

FIELD OF THE INVENTION

This invention relates to a process and apparatus for directly contacting two immiscible liquid phases, e.g. liquid/liquid extraction or heat exchange and, more particularly to a system for increasing the throughput of two counterflowing immiscible liquid phases in columns with perforated plates which define mixing zones and separating zones and in which each mixing zone receives the heavy-liquid phase (more dense liquid) entering through perforations from above and the light-liquid phase (less dense liquid) entering through perforations from below and the dispersion formed by the two liquid phases in each mixing zone is transferred from the latter into a juxtaposed separating zone, from which heavy liquid phase is withdrawn downwardly through perforations, and light liquid phase is withdrawn upwardly through perforations.

BACKGROUND OF THE INVENTION

It is known (see German Auslegeschrift - Printed Application No. 1,124,021) to contact two counterflowing liquid phases in columns which contain perforated plates and in which one liquid phase is distributed by means of holes and the other liquid phase flows across the plates and from one plate to another along a zig-zag path.

There are also columns (see U.S. Pat. Nos. 2,609,276 and 2,610,108) which contain perforated plates and in which both liquid phases flow through holes. This system uses stepped plates, in which a portion formed with the holes for the heavy liquid phase is disposed below and a portion formed with the holes for the light liquid phase is disposed above the remaining portion of the plate.

The light and heavy liquid phases can flow through holes in inclined rather than stepped plates (see German Auslegeschrift - Printed Application No. 1,263,695) and is caused to flow from one side to a diametrical line and back rather than from one side to the other (see U.S. Pat. No. 3,632,315 and German Gebrauchsmuster - Utility Model No. 71 42 672).

It is also known to cause the liquids to flow from the periphery to the center and back to the periphery (see German Auslegeschrift - Printed Application No. 1,263,696).

It has also been proposed to provide mixer-separator extractors having a separating chamber which is filled with stainless-steel turnings to accelerate the coalescence (see German Pat. No. 1,442,444).

The throughputs which can be achieved with these processes and associated apparatus for contacting two liquids are not satisfactory, particularly with systems of two liquid phases having low surface tensions.

OBJECTS OF THE INVENTION

It is an object of the present invention to improve the throughput of a liquid-liquid contactor over that of prior-art systems even when the two mutually contacted liquids are of low surface tension.

Another object of the invention is to provide a process and an apparatus for improved liquid-liquid contacting e.g. liquid/liquid extracting, whereby disadvantages of conventional processes and equipment are obviated.

Yet another object of our invention is to provide an economical, convenient and low-cost process and apparatus for increasing the throughput of two counterflowing immiscible liquid phases of different densities (specific gravities) in a liquid-liquid contactor, especially a liquid/liquid extractor.

SUMMARY OF THE INVENTION

Surprisingly, we have found that in a conventional column having perforated plates which define mixing zones and separating zones, the throughputs achieved with the known processes and equipment can be increased by filling the separating zones between the perforated plates with a material which accelerates the coalescence, particularly with liquid phases having an interfacial tension below 10 dynes/cm.

According to a preferred feature of the invention, turnings of stainless steel are used as the material which accelerates the coalescence and as the filling or packing although coalescence can also be accelerated by turnings of iron, copper or brass, as well as by wood wool, glass filaments, filaments made of polyethylene, polypropylene, polyvinylchloride, polytetrafluoroethylene, polyacrylonitrile and/or polyester and by mixtures thereof used together with the stainless steel turnings or alone.

According to another feature of the invention, the perforated plates in the column are stepped and each liquid is caused to flow from one side to the other. The perforated plates in the column can also be inclined so that each liquid phase flows from one side to the other. Within the scope of the invention, moreover, the perforated plates in the column can be stepped and each liquid phase may be caused to flow from the edge (periphery) inwardly to a diagonal and from the diagonal outwardly back to the edge or periphery.

According to a further feature of the invention, the perforated plates in the column are conical and each liquid phase is caused to flow from the edge (periphery) to the center and from the center to the edge (periphery). Means for dispersing the two liquid phases in order to increase the interfacial area are provided between the apices of the conical plates. The means for dispersing the two liquid phases can be a stirrer which rotates about its axis, or can be an object which reciprocates in the vertical direction and/or in a horizontal direction.

According to still another feature of the invention, the column is provided between groups of three to ten plates with a stilling (quiescence or calming) zone filled with a material which accelerates the coalescence. It is also desirable to cause the two liquids phases to flow through the stilling or calming zone along paths which are separated from each other.

The apparatus according to another aspect of the invention comprises a vertical cylindrical vessel which is provided near its top with an inlet for a heavy-liquid phase and with an outlet for a light-liquid phase, and near its bottom with an inlet for the light-liquid phase and with an outlet for the heavy-liquid phase. The vessel or housing contains plates having perforations forming flow passages for the heavy-liquid phase and disposed above the perforations forming flow passages for the light liquid phase. The mixing zones for mixing the two liquid phases occupy 10–30% of the cross-sectional area of the vessel whereas the plates have no perforations in an area corresponding to 40–80% of the cross-sectional area of the vessel. This area and an area which occupies 10–30% of the cross-sectional area of the container and through which liquid is withdrawn define a separating zone for the liquid phases. This separating zone is filled with the aforedescribed material which accelerates the coalescence.

To promote the dispersion of the two liquids and to increase the interfacial area, stirrers or vertically or horizontally reciprocable rods or perforated plates are arranged between the apices of the conical perforated plates mentioned previously.

A key advantage of the invention is that the throughput of the contacting apparatus can be increased considerably. The process and the apparatus of the invention permits direct contacting of systems of two liquid phases which have low interfacial tensions. The process and apparatus according to the invention can, moreover, be used for all operations in which two immiscible liquid phases are to be contacted as intimately as possible, whether this contact serves to accomplish a mass transfer, e.g., in an extracting operation, or a heat transfer or a chemical reaction.

BRIEF DESCRIPTION OF THE DRAWING

The invention is illustrated diagrammatically and by way of example in the accompanying drawing and will subsequently be described in detail.

IN THE DRAWING

Figure 4:
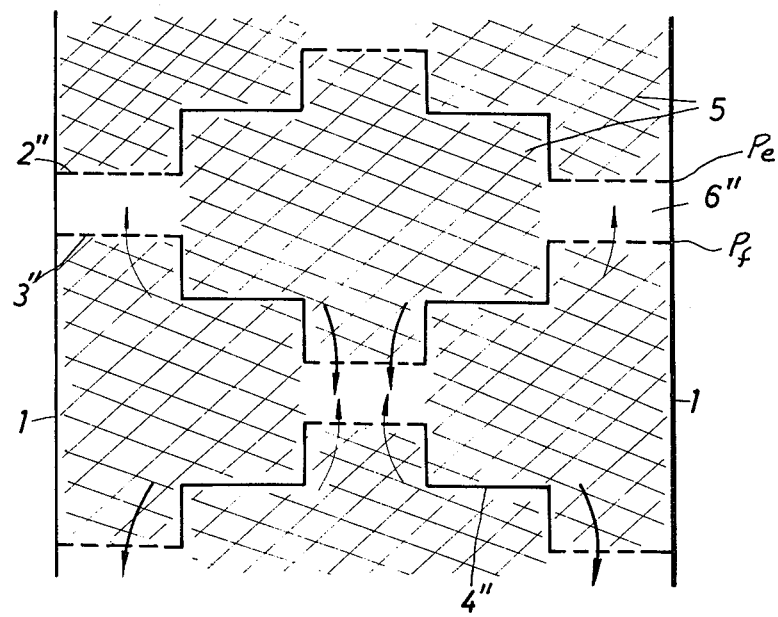
Figure 5:
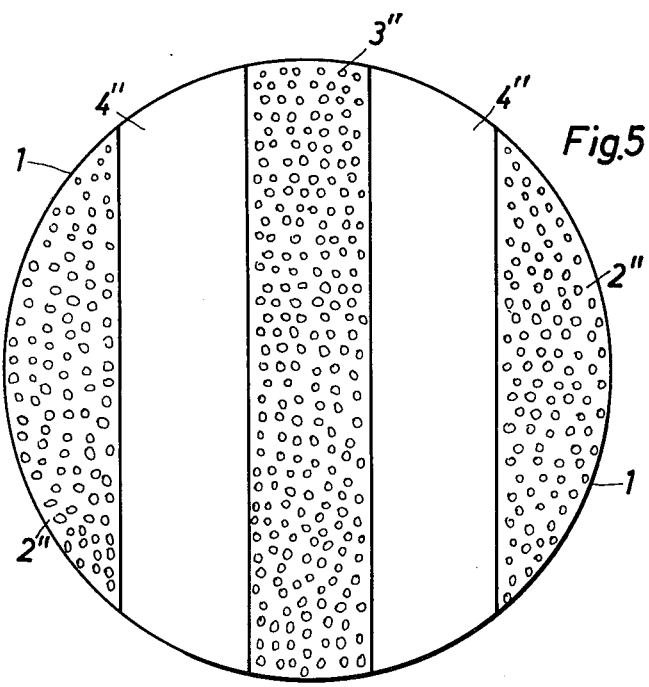
Figure 6:
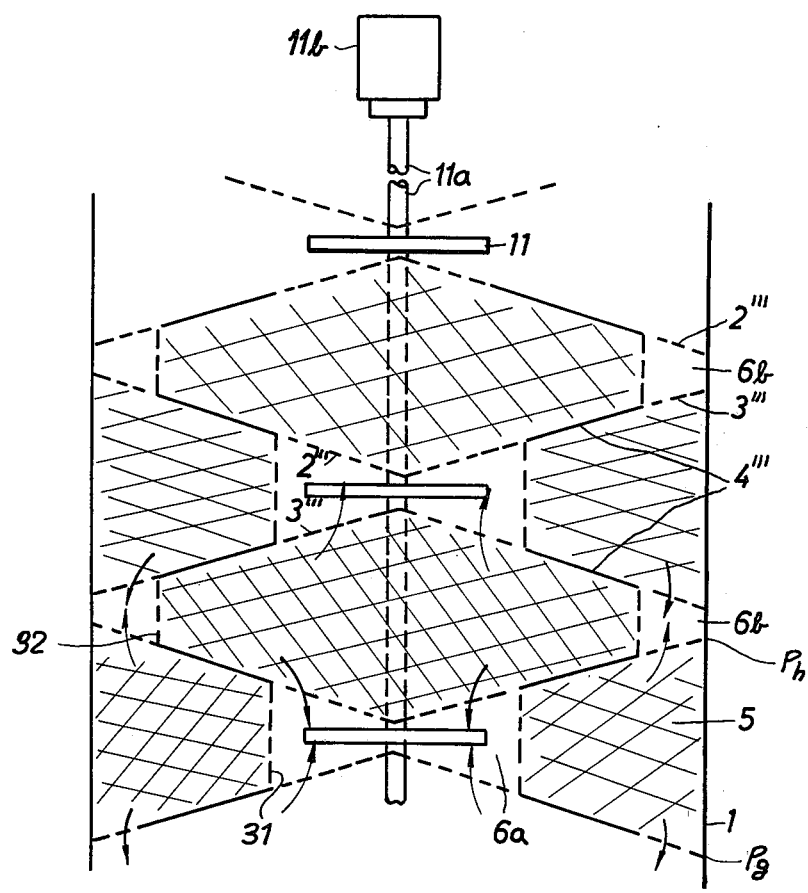
Figure 7:
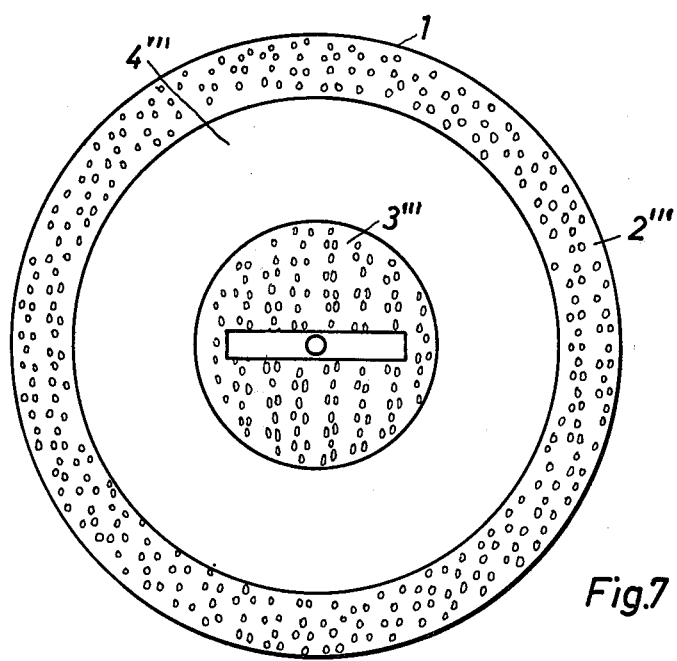
Figure 8:
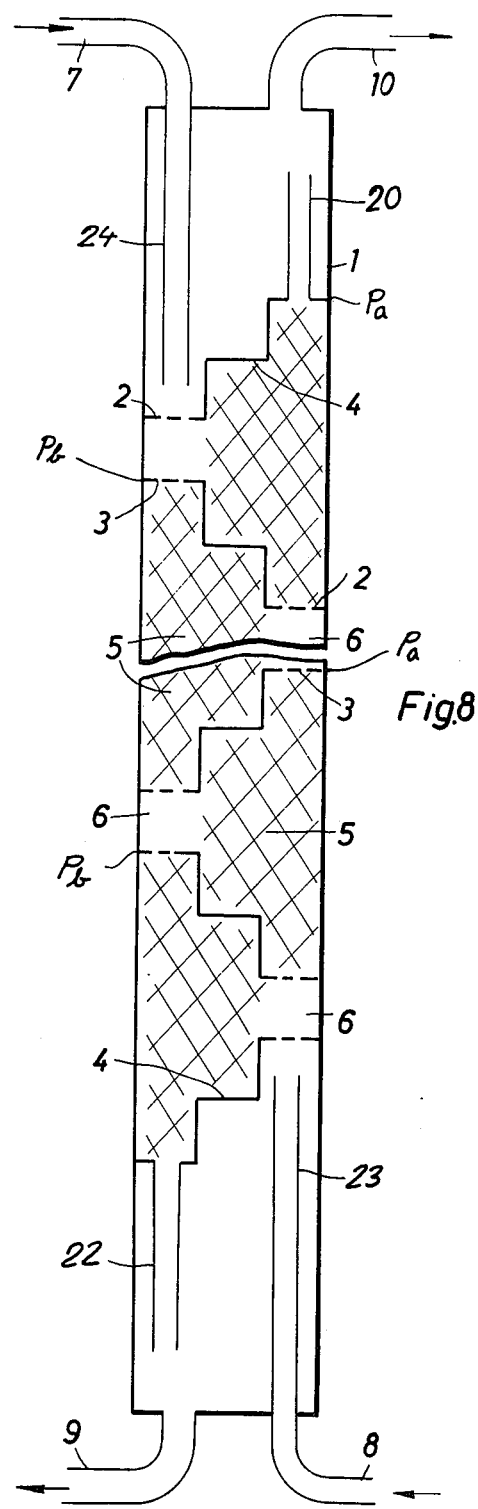

FIG. 1 is a transverse sectional view diagrammatically showing a column having stepped perforated plates, on which both phases are caused to flow diametrically from one side to the opposite side;

FIG. 2 is a transverse sectional view diagrammatically showing a column having inclined perforated plates on which the liquid phases are caused to flow diametrically from one side to the opposite side;

FIG. 3 is a top plan view showing the pattern of the perforations in FIGS. 1 and 2;

FIG. 4 is a transverse sectional view diagrammatically showing a column with stepped plates, on which both liquid phases are caused to flow from the edge (or an outer zone) to a diagonal line at the center and back to an edge or another outer zone;

FIG. 5 is a top plan view showing the pattern of the perforations in FIG. 4;

FIG. 6 is a transverse sectional view diagrammatically showing a column having conical perforated plates and stirrers;

FIG. 7 is a top plan view showing the arrangement of the perforations in FIG. 6;

FIG. 8 is a diagrammatic vertical (axial) sectional view showing an entire cylindrical column having perforated plates; and FIG. 9 is a similar diagrammatic section showing a column having perforated plates and a stilling or calming chamber.

SPECIFIC DESCRIPTION AND EXAMPLE

The drawing shows a cylindrical shell 1 of a column with plates $P_a$-$P_h$ each having a perforated portion 2, 2', 2'', 2''' forming flow passages for the heavy phase (heavy arrows), a perforated portion 3, 3', 3'', 3''' forming flow passages for the light phase (light arrows), and an unperforated portion 4, 4', 4'', 4'''. Coalescence-accelerating material 5 is disposed in the separating chamber. A mixing chamber 6, 6', 6'', 6a or 6b is disposed between each two perforated plates. FIGS. 8 and 9 further show a heavy-liquid inlet 7, a light-liquid inlet 8, a heavy-phase outlet 9, a light-phase outlet 10, a stirrer 11, 11a, 11b and a stilling or calming chamber 12 (FIG. 9) which is also filled with coalescence-accelerating material.

In FIGS. 1, 8 and 9 the plates $Pa$ and $Pb$ are stepped and are identical except for being relatively rotated by 180° about the vertical axis of the cylindrical vessel 1, the two phases crossing from one side to the other over the imperforated segment 4 between the two perforated segments 2, 3. A screen 30 can hold the packing 5 in place. The monperforated areas 4 occupy 40–80% of the respective cross sections of the vessel while the perforated segments 2, 3 occupy each 10 to 30% of the cross section.

In FIG. 2, the plates $Pc$ and $Pd$ are inclined to one another and to the axis of the cylindrical vessel and are again rotated relatively through 180°. The perforated zones 2' and 3' of each pair of plates converge to form the wedge-shaped mixing chambers 6 between them.

Stepped plates $Pe$ and $Pf$ of FIG. 4 are rotated relatively through 180° about a horizontal so that their central perforated segments 2'' or 3'' define central chambers 6'' while their outer perforated segments define outer mixing chambers between them. Here the two phases flow alternately inwardly to and outwardly from the central perforated segments.

Conical plates $Pg$ and $Ph$ in the embodiment of FIGS. 6 and 7 have circular perforated zones 2''' and 3''' defining a central imperforated zone 4''' between them, the plates being relatively rotated through 180° about a horizontal axis. The packing 5 is disposed in zones of radially increasing or decreasing height defined by annular screens 31, 32. Here again the phases flow alternately inwardly and outwardly. The stirrer blades 11 can be carried upon a central shaft 11a which is rotated and reciprocated by a motor 11b.

In all of the above described embodiments, the packing 5 is preferably stainless steel turnings although it can be one of the other packing materials described.

The light phase exits from the uppermost plate $Pa$ (FIGS. 8 and 9) through a riser 20 reaching substantially to the top of the column while the heavy phase enters through a vertical pipe 24 reaching downwardly to a location just above the perforations 2 of this plate.

The heavy phase leaves through a downcomer 22 reaching almost to the bottom of the column while the light phase enters through an upcomer or viser 23 terminating just below the perforations 3 of the lowest plate.

EXAMPLE

A column was used which was designed as shown in FIG. 8 and 300 mm in diameter and had perforated plates 4 defining a separating zone 5, which was filled with turnings of stainless steel. This column was fed at its top through conduit 7 at a rate of 2.0 m³/h with mixed solvents consisting of N-methylpyrrolidone (hereinafter referred to as NMP) and monoethylene glycol (hereinafter referred to as glycol) in equal parts by weight, and at its bottom through conduit 8 at a rate of 1.0 m³/h with a mixture consisting of toluene and heptane in equal parts by weight. The two liquid phases are immiscible with each other and have an interfacial tension of 2 dynes/cm. Light liquid phase consisting of heptane and 8% toluene and 4% NMP was withdrawn from the column through conduit 10 at a rate of 0.5 m³/h and contained less than 1% of dispersed heavy liquid phase. Heavy liquid phase which contained the solvent, a major portion of the toluene, and about 3% heptane, was withdrawn through the lower outlet 9 of the column at a rate of 2.5 m³/h. Less then 1% light phase liquid was dispersed in this heavy liquid phase.

Comparative Experiment 1

A comparative experiment was carried out with a column which contained perforated plates and was similar to that shown in FIG. 8 with the exception that the separating zone between the plates was empty rather than filled with turnings of stainless steel. The same products were supplied and withdrawn in the same quantitative proportions. When solvent was supplied at a rate of 1.6 m³/h and mixed hydrocarbons were supplied a rate of 0.8 m³/h, more than 1% dispersed light liquid phase were measured in the heavy liquid phase withdrawn through conduit 9 and more than 1% of dispersed heavy liquid phase were measured in the light liquid withdrawn through conduit 10.

Comparative Experiment 2

Another comparative example was carried out in a column which had perforated plates and had the same diameter as the columns used in the Example and in Comparative Experiment 1 but was provided with filling of the type described in Printed German Application (Auslegeschrift) No. 1,124,021. The same products in the same quantitative proportions were supplied and withdrawn. When solvent was supplied through conduit 7 at a rate of 1.2 m³/h and mixed hydrocarbons were supplied through conduit 8 at a rate of 0.6 m³/h, more than 1% dispersed light liquid phase were measured in the heavy liquid phase withdrawn through conduit 9 and more than 1% dispersed heavy liquid phase were measured in the light liquid phase withdrawn through conduit 10.

We claim:

1. In a process for contacting two counterflowing immiscible liquid phases in a column in which perforated plates define mixing zones and separating zones and in which each mixing zone receives a heavy-liquid phase entering through perforations from above and a light-liquid phase entering through perforations from below and a dispersion formed by the two liquid phases in each mixing zone is transferred from the latter into a juxtaposed separating zone, from which the heavy-liquid phase is withdrawn downwardly through perforations and the light-liquid phase is withdrawn upwardly through perforations, the improvement in which the dispersion is contacted in the separating zones with a filling of a material which accelerates coalescence.

2. The improvement defined in claim 1 wherein the liquid phases flowing through the column have an interfacial tension below 10 dynes/cm.

3. The improvement defined in claim 1 wherein turnings of stainless steel are said material which accelerates coalescence.

4. The improvement defined in claim 1 wherein said material accelerating the coalescence includes turnings of iron, copper or brass, wood wool, glass filaments, filaments of polyethylene, polypropylene, polyvinylchloride, polytetrafluoroethylene, polyacrylonitrile or polyester, or mixtures thereof.

5. The improvement defined in claim 1 wherein the perforated plates in the column are stepped and each liquid phase is caused to flow from one side to the other.

6. The improvement defined in claim 1 wherein the perforated plates in the column are inclined and each liquid phase is caused to flow from one side to the other.

7. The improvement defined in claim 1 wherein the perforated plates in the column are stepped and each liquid phase is caused to flow alternately inwardly and outwardly.

8. The improvement defined in claim 1 wherein the perforated plates in the column are conical and each liquid phase is caused to flow alternately inwardly and outwardly.

9. The improvement defined in claim 8, further comprising the step of agitating said phases between the apices of the conical plates.

10. The improvement defined in claim 9 wherein said phases are agitated by rotating a stirrer to disperse the two liquid phases.

11. The improvement defined in claim 10 wherein said phases are agitated by reciprociting an object to disperse the two liquid phases.

12. The improvement defined in claim 1 wherein between groups of three to ten plates said phases are passed through a stilling zone filled with said material.

13. The improvement defined in claim 12 wherein the two liquid phases are caused to flow through the stilling zone along paths which are separated from each other.

14. In an apparatus for contacting a heavy-liquid phase with a light-liquid phase which comprises a vertical cylindrical vessel formed near its top with an inlet for said heavy-liquid phase and with an outlet for said light-liquid phase and near its bottom with an inlet for said light-liquid phase and with an outlet for said heavy-liquid phase, and which contains plates having perforations forming flow passages for the light-liquid phase and perforations forming flow passages for the heavy-liquid phase and disposed above the perforations forming flow passages for the light-liquid phase, the superposed perforated portions forming mixing zones for mixing the two liquid phases occupying 10–30% of the cross-sectional area of the vessel, the plates being unperforated in an area which occupies 40–80% of the cross-sectional area of the container so that this area and an area which occupies 10–30% of the cross-sectional area of the container and through which liquid is withdrawn define a separating zone for the liquid phases, the improvement wherein said separating zone is filled with a material which accelerates coalescence.

15. The improvement defined in claim 14 wherein the material which accelerates coalescence consist of turnings of stainless steel.

16. The improvement defined in claim 14 wherein the material which accelerates coalescence consists of turnings of iron, copper or brass, wood wool, glass filaments, or filaments made of polyethylene, polypropylene, polyvinylchloride, polytetrafluoroethylene, polyacrylonitrile and polyester or of mixtures of these materials.

17. The improvement defined in claim 14 wherein the perforated plates are stepped.

18. The improvement defined in claim 14 wherein the perforated plates are inclined.

19. The improvement defined in claim 14 wherein the perforated plates are conical.

20. The improvement defined in claim 19, further comprising stirrers between the apices of the conical perforated plates.

21. The improvement defined in claim 19, further comprising reciprocable members arranged between the apices of the conical perforated plates.

22. The improvement defined in claim 14, further comprising a stilling chamber between groups of three to ten of said plates and filled with said material.

* * * * *